(12) United States Patent  
Edmunds (10) Patent No.: US 7,640,505 B1
(45) Date of Patent: Dec. 29, 2009

(54) ELEMENT VIEW TOGGLING

(75) Inventor: Randall Edmunds, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 694 days.

(21) Appl. No.: 11/112,964

(22) Filed: Apr. 22, 2005

(51) Int. Cl.
  *G06F 3/00* (2006.01)
  *G06F 3/14* (2006.01)
(52) U.S. Cl. .................. 715/744; 715/765; 715/788
(58) Field of Classification Search ............. 715/202, 715/205, 234, 235, 238, 744, 760, 762, 764, 715/765, 781, 788, 810, 815
  See application file for complete search history.

(56) References Cited

U.S. PATENT DOCUMENTS

| | | | |
|---|---|---|---|
| 6,330,007 B1 * | 12/2001 | Isreal et al. ................ | 715/762 |
| 7,370,274 B1 * | 5/2008 | Stuple et al. ................ | 715/255 |
| 2003/0233620 A1 * | 12/2003 | Vedullapalli et al. ........ | 715/522 |
| 2004/0148307 A1 * | 7/2004 | Rempell .................... | 707/102 |
| 2005/0187895 A1 * | 8/2005 | Paya et al. ................... | 707/1 |
| 2005/0188322 A1 * | 8/2005 | Napoleon ................... | 715/760 |
| 2006/0026495 A1 * | 2/2006 | Shaw et al. ................. | 715/500 |
| 2006/0048063 A1 * | 3/2006 | Stackowicz et al. ......... | 715/764 |
| 2006/0218490 A1 * | 9/2006 | Fink ........................... | 715/517 |

\* cited by examiner

*Primary Examiner*—X. L Bautista (57) ABSTRACT

A system and method to allow element toggling in a webpage design application include providing a user with an option to toggle a current view of a selected object, and changing said view of said object in response to the user exercising said option.

20 Claims, 5 Drawing Sheets

ELEMENT VIEW TOGGLING

TECHNICAL FIELD

The present invention generally relates to web page development environments and application development environment design and display, and relates particularly to views of visual objects therein.

BACKGROUND OF THE INVENTION

Hyper Text Markup Language (HTML) is a presentation language that uses a fixed set of tags to describe the content of a document (usually a web page). Cascading Style Sheets (CSS) is a style sheet format for HTML documents that has been endorsed by the World Wide Web Consortium. CSS style sheets can be used to apply layout styles to web pages. In currently available web page design software, a user interface may provide the designer with both a code view to edit HTML (or other presentation language) and CSS code and a design view to edit the actual web page by interacting with a rendered view especially for design time. Thus, a user, at any one time, can choose between editing the same web page through code or through a graphical interface.

In the design view, most elements on the page render in their full size in the flow of the page. Most elements begin where another element ends, such that the wider they are or the taller they are, the more they push some of the other elements down or over. There are also absolutely positioned elements that are similar to a layer on top of the page. Some of these elements may be partially or fully obscured, so there is no way to really see them in their entireties or to edit them in the design view.

For example, an object may be an end-user license agreement that is quite long, such that its contents take up more than the visual space allotted to the average web page object. As a result, a web page designer may put the agreement in a box with scroll bars so that a viewer sees portions of the agreement at a time by scrolling through the agreement. During design time, however, the designer may want to be able to edit the contents of the agreement but may find it inconvenient or impossible to access some or all of the contents in the box-and-scroll-bar view. The designer may then desire to change the design view so that the entire agreement is visible and accessible for editing.

One solution to this problem has been to avoid the design view for editing obscured objects. However, for users who prefer to use a design view rather than working with HTML code, such a solution may be unacceptable because it is tedious and requires extensive knowledge of computer code. Another solution is for the web page design software to always show an unobscured version of the object in the design view. This solution may also be unacceptable because such large objects may destroy the layout of the page in the design view. In other words, the user can see the whole element itself, but the rest of the page may be obscured, rearranged, etc.

Some designers have adapted by going to the code view and removing some settings, changing some settings, commenting-out some settings, and the like to make an otherwise obscured object appear in its entirety in the design view. The user then edits the object in the design view, and when he or she is done, goes back to the code view and places the object back into an obscured view to restore the layout of the page. This approach, however, may require extensive knowledge of code (HTML, Cascading Style Sheets, JavaScript, and/or the like) and the ability to remember exactly which changes were made so that they can be changed back.

BRIEF SUMMARY OF THE INVENTION

Various embodiments of the present invention provide web designers with a user interface feature that allows them to selectively toggle between viewing an entire element and viewing the obscured view.

In one embodiment, there is a toggle function that brings an entire element into view so that a designer can make edits and then toggle back to the obscured view. The obscured view may be desired when a designer is looking at the layout of the whole page. But when the designer wants to look at a particular element he or she may prefer the full view. In the box-and-scroll-bar example, a designer may toggle views to switch between the box view and the whole document view to reveal the whole end user license agreement in the design view. This toggling may be accomplished without making changes to the code. The toggle feature may also be applied to elements that are totally hidden, rather than just partially obscured.

In one example, this feature is implemented through adding functionality in the web design program that allows a user to select an object in the design view and to pull up a menu that offers an option to change the design time view of the object. If the designer chooses to change the design time element view, the web design program edits an internal design time style sheet that will re-render the design view to present the entire object. When the designer chooses to return to the obscured design time element view, he or she may pull up the menu and select the option to change the design time view. Again, the program edits the internal design time style sheet so that the object is rendered in the obscured view.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
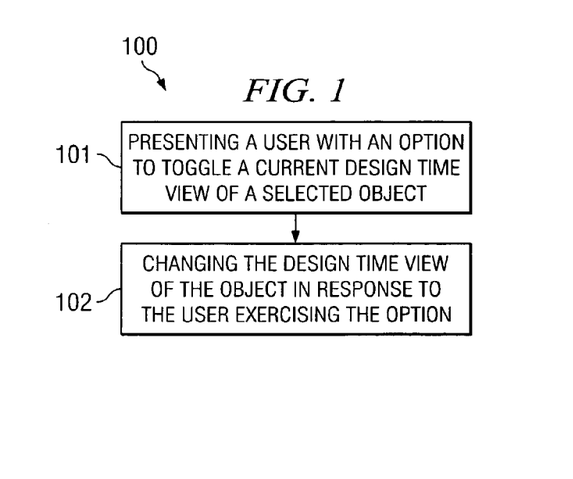
FIG. 1 is a flowchart illustrating example steps to implement one embodiment of the invention, for performing automatic design time view changes.

FIG. 1 is a flowchart illustrating example steps to implement one embodiment of the invention, for performing automatic design time view changes. As used herein, "design time view change" refers to changing a view of an object in a design view user interface. Further, an object may be an element, such as a visual element, that is part of the web page application. An object may, itself, include one or more other objects. A design time interface is a user interface that displays a graphical view of an application or web page during design time. Method 100 may be performed by a computer executing a web page creation program, such as DREAMWEAVER® software, available from Macromedia, Inc., of San Francisco, Calif.

In block 101, the computer presents an option to a user to toggle a current design time view of a selected object, wherein the current design time view may obscure some or all of the selected object, and the user may desire to view and access the object as a whole. The object may be obscured by being placed in a box smaller than its full display size, have a style applied that specifies that it is hidden, or the like. The computer presents the option to change the design time view in one of a number of ways. For example, the user may move the cursor over the object and right-click using a pointing device, thereby selecting the object and notifying the program that some action is desired. The program may then display a menu that presents an option to toggle the design time view. While a menu is not shown in FIG. 1, an exemplary menu is depicted in FIG. 2.

In block 102, the computer changes the design time view of the object in response to the user exercising the option. In one example, the program changes the design time view from a box-and-scroll-bar view to a view that shows all of the contents of the object. In an example case of a large end user license agreement, the contents of the agreement are then available for modification in the design time interface after the design time view has been changed. While the very large end user license agreement, rendered its entirety, may result in other objects being moved or obscured, the design time view of the object may be toggled again in the same way to return to the box-and-scroll-bar view. Also, the computer program may provide a refresh function that sets the design time view for all objects back to their default views (which are usually similar to the views that most web browsers will display). In this example embodiment, the toggling feature provides an easy and convenient way for a web page designer to access the content in obscured objects, while seamlessly returning to an obscured view later.

Figure 2:
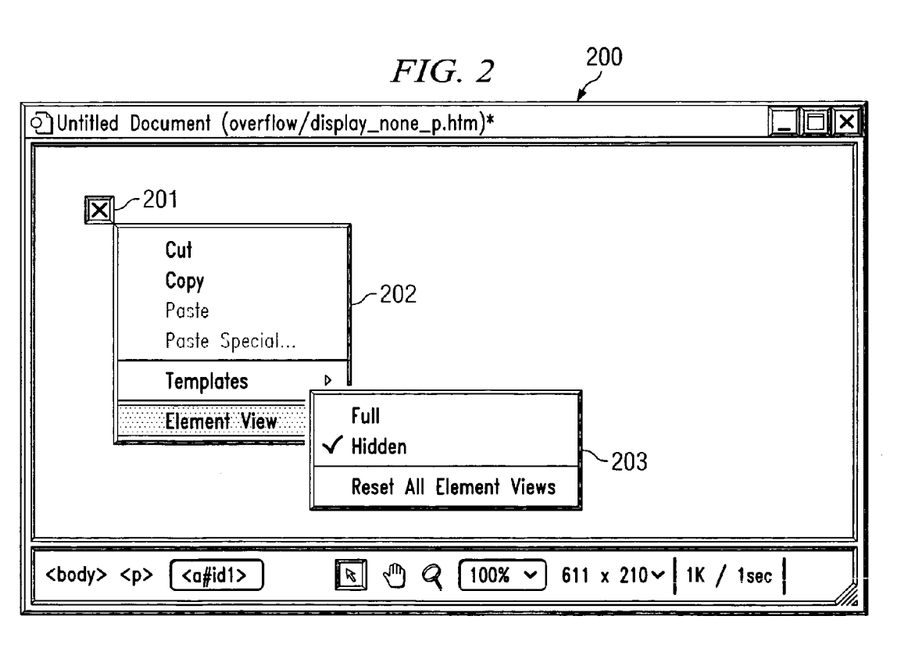
FIG. 2 is a screen shot illustrating an exemplary design view, adapted according to an embodiment of the invention.

FIG. 2 is a screen shot illustrating exemplary design view 200, adapted according to an embodiment of the invention. In design view 200, a user has selected object 201, and the computer has presented an option to change the design time view of object 201 through use of menus 202 and 203. It should be noted that menus and submenus are referred to herein as "menus" for convenience. Menu 202 allows the user to select menu 203 for element view properties. As shown, design view 200 does not render object 201 because object 201 is a "display:none" object, as defined in Cascading Style Sheets (CSS) code. In other words, object 201 is in a hidden or obscured view. As described above with regard to method 100 (of FIG. 1), the user may use menus 202 and 203 to change the design time view of object 201 so that the object is fully visible and accessible in design view 200. The user may use, for example, a mouse or other such pointing device to select the "full" design time view.

Figure 3:
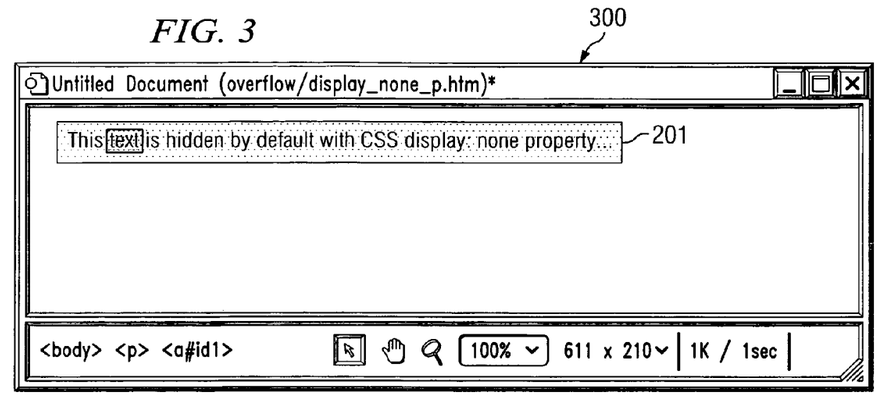
FIG. 3 is a screen shot illustrating an exemplary design view, adapted according to an embodiment of the invention.

FIG. 3 is a screen shot illustrating exemplary design view 300, adapted according to an embodiment of the invention. Design view 300 shows the full design time view of formerly-obscured object 201. The user has toggled the design time view from "hidden" to "full," as discussed above with regard to FIG. 2. Because object 201 is fully displayed in design view 200, the user may directly edit object 201 in the design view, rather than having to go to the code view. When the user is done with editing object 201, he or she may use menus 202 and 203 (of FIG. 2) to toggle object 201 back to hidden view. Alternatively, the user may decide to leave object 201 in full view. As will be explained more fully below, design views 200 and 300 are merely for design time and do not, themselves, affect the presentation of the designed web page to a human viewer at a browser. A viewer at a browser who views the designed web page with object 201 will most likely see a view that resembles that of FIG. 2 because object 201 is a "display:none" object.

In CSS, a "visibility:hidden" element is similar to a "display:none" element. The difference between a "visibility:hidden" element and a "display:none" element is that the "display:none" element takes up no space on the page, whereas the "visibility:hidden" element actually takes up the space on the page but is not drawn. Various embodiments of the invention may be applied to "visibility:hidden" elements in a manner similar to that described with regard to FIGS. 2 and 3.

Figure 4:
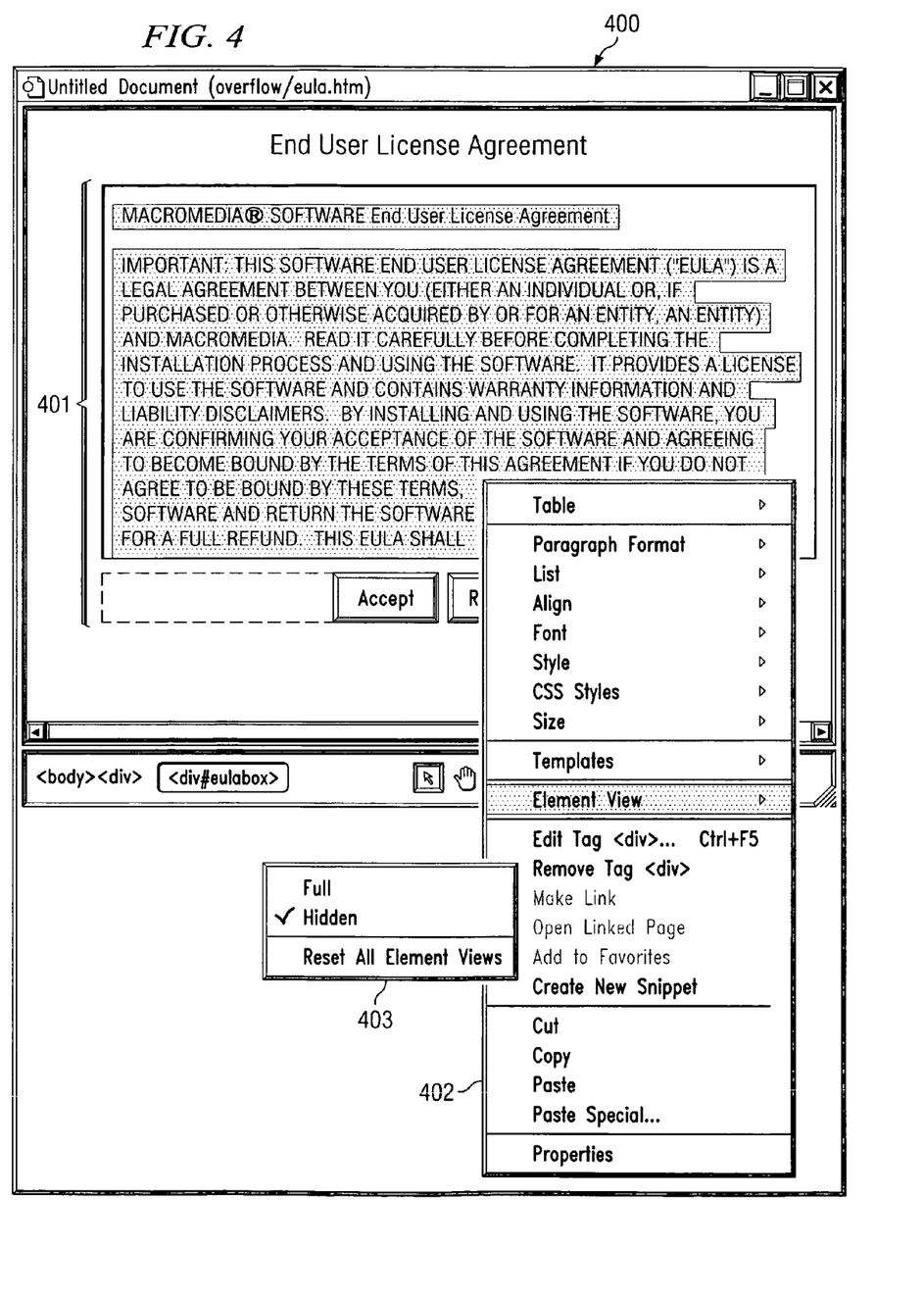
FIG. 4 is a screen shot illustrating an exemplary design view, adapted according to an embodiment of the invention.

FIG. 4 is a screen shot illustrating exemplary design view 400, adapted according to an embodiment of the invention. In design view 400, object 401 is selected by a user, and the computer has displayed menus 402 and 403 for the user to change the current design time view of object 401, if he or she desires. Object 401 is an end-user license agreement that, in its entirely, would require a very large viewing area that would not be renderable on a typical display. Design view 400 presents object 401 as it would most likely appear on a web browser in this hidden view—that is, in a box (without a scroll bar, however, for simplicity). Accordingly, the web designer using the web page design application may only be able to access the content found within the borders of the box that cuts off object 401. The web page designer may desire to display the full agreement in order to edit the content. Therefore, the designer may select the "full" view from menu 403.

Figure 5:
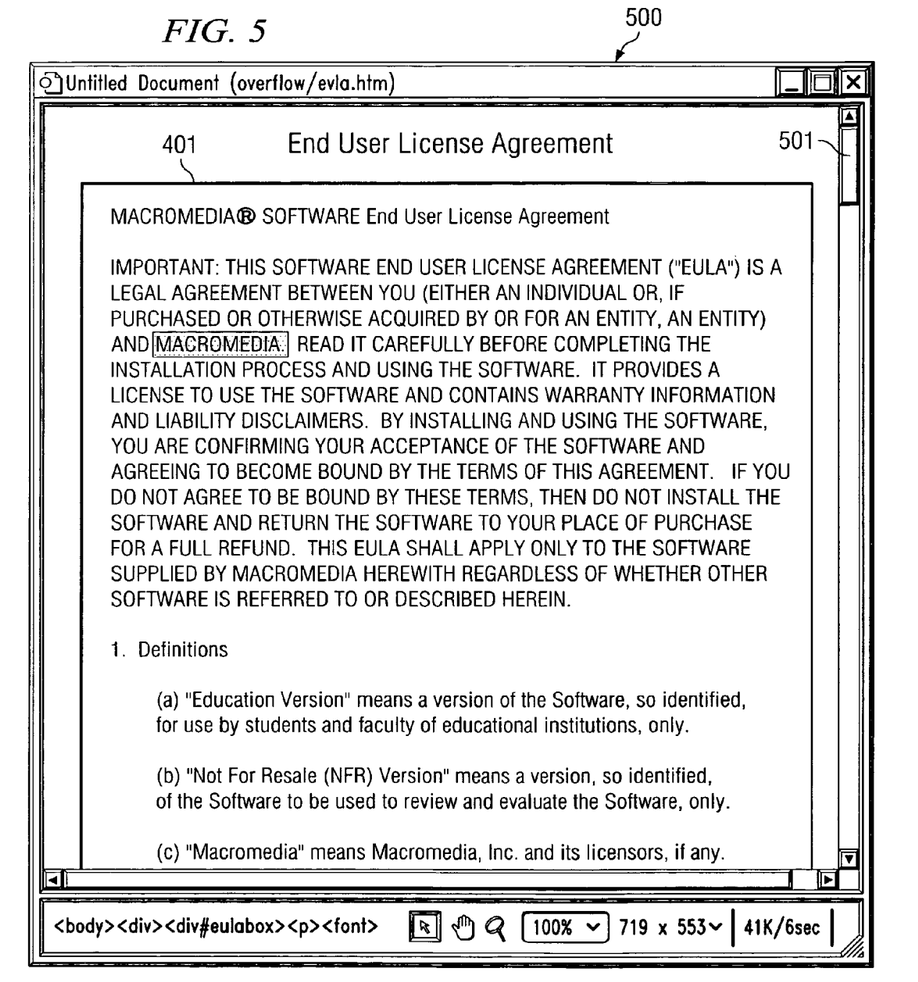
FIG. 5 is a screen shot illustrating an exemplary design view, adapted according to an embodiment of the invention.

FIG. 5 is a screen shot illustrating an exemplary design view 500, adapted according to an embodiment of the invention. Design view 500 shows object 401 as it would appear to a user after having toggled to a "full" view. Object 401 is no longer truncated by a box, as in view 400 (of FIG. 4); however, because of its size, the user may have to use scroll bar 501 to access all of the content therein. Design views 200-500 present only one web page object each for convenience, but it should be noted that practical web page designs will often have a plurality of objects, and such designs are within the scope of various embodiments. In such a practical web page design, the full design time view of object 401 may obscure other objects on the page from the sight of the designer. The designer may then toggle back to hidden view in much the same manner as he or she toggled to the full view.

It should also be noted that web page designs may include objects other than text objects, and the invention is not limited to applying only to such text objects. For example, a web page may contain multimedia objects, such as images, movies, and sound objects. Various embodiments of the present invention may be used with any type of web page object regardless of media type.

Figure 6:
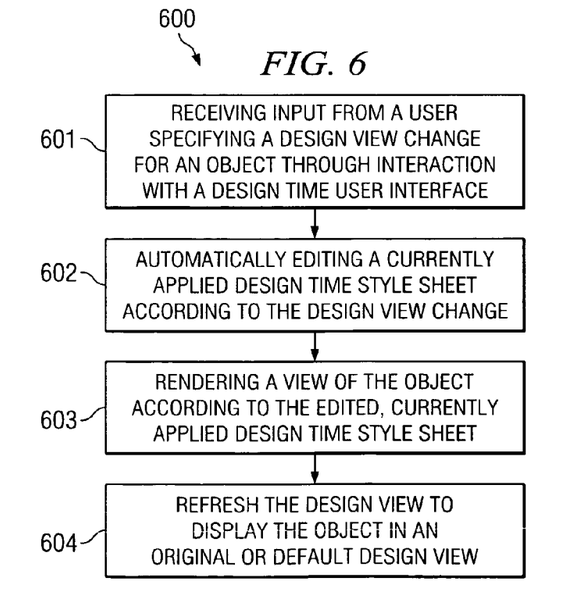
FIG. 6 is a flowchart illustrating example steps to implement one embodiment of the invention, for performing automatic design time view changes.

FIG. 6 is a flowchart illustrating example steps to implement one embodiment of the invention, for performing automatic design time view changes. Method 600 may be performed by a computer that is executing a web page design program. In block 601, the computer receives input from a user specifying a design time view change for an object through interaction with a design view user interface. For example, the user may right-click on an object and select a toggle function from a context menu. In an additional example, the program may recognize a double-click on the object as a request to toggle a design time view of the object. Any method of receiving input from a user is within the scope of various embodiments.

In block 602, the computer automatically edits a currently applied design time style sheet according to the design time view change. In one example, the design time view is rendered from code in memory that specifies a number of styles. The code is, in effect, an internal style sheet, and it may be based on one or more user-specified style sheets. The computer program adds, subtracts, changes styles, and the like in the internal style sheet in order to change the current design time view. In this way, there may be no need to actually change any user-specified design time style sheets because the changing is done with respect to the internal style sheet.

In block 603, the computer renders a view of the object according to the edited, currently applied design time style sheet. Thus, the web page design program may display the object in a full view, a hidden view, or another type of view, depending on the instruction from the user. In this example, it is possible for the user to repeat method 600 to switch to another design time view of the object. It is also possible for the user to instruct the computer to refresh the design time view to display the object in its original or default design view, as in block 604. This refreshing feature is accomplished in at least one embodiment implemented in DREAMWEAVER® through the user pressing the F5 key, which triggers the computer program to edit the currently applied, internal design time style sheet to reflect a default view, such as would be viewed with INTERNET EXPLORER® 6 (available from Microsoft Corporation), for each of the web page objects. Various embodiments may use method 600 to provide a quick and convenient way for a user to switch between desired design time views.

Figure 7:
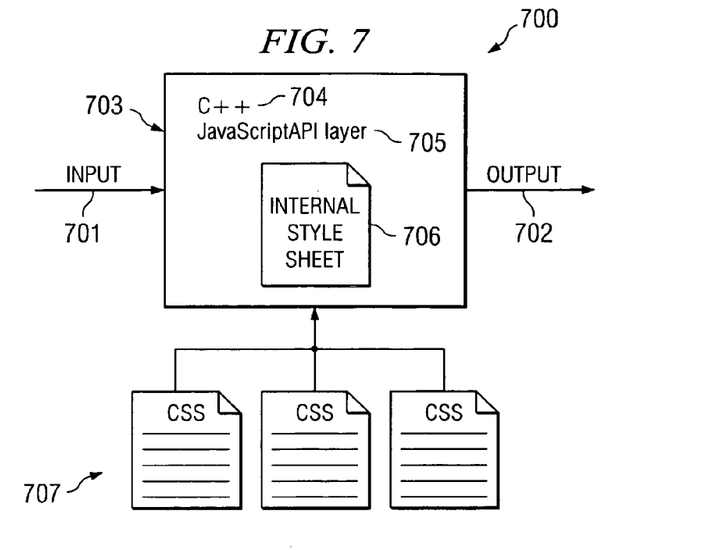
FIG. 7 is a block diagram illustrating an exemplary system, which is one embodiment of the present invention that utilizes DREAMWEAVER®.

FIG. 7 is a block diagram illustrating exemplary system 700, which is one embodiment of the present invention that utilizes a web page development or application development environment. As implemented in DREAMWEAVER®, system 700 is able to perform methods 100 and 600 (FIGS. 1 and 6, respectively) to provide design time view changes. Program 703 has input 701, which includes user input 701 and output 702, which includes display output to the user. The functionality of program 703 is provided, at least in part, by C++ code 704 and JavaScript Application Programming Interface (API) layer 705, which are executed by a processor in a computer system. C++ code 704 provides much of the substantive capability, such as changing internal style sheet 706, while JavaScript API layer 705 provides interactive features to the user interface, such as menus 202 and 203 (FIG. 2).

A user may specify one or more CSS style sheets 707 to be used during design time to produce a design view. Program 703 uses each of style sheets 707 (or portions thereof) to produce internal style sheet 706, which is applied to produce the design view that the user sees in the design view interface. During a design time view change, program 703 makes changes to internal style sheet 706, and those changes are reflected in the design time view of an object that is rendered to the user through output 702. The design time view changes are implemented according to methods 100 and 600, as explained above.

DREAMWEAVER® program products are used to develop web pages that are viewed through use of a web browser. Thus, the output of program 703 may include, as a finished product, one or more files to be placed on web servers and rendered to various viewers over the Internet. While internal style sheet 706 may be changed to provide hidden and full views of one or more objects during design time, such changes are not usually reflected in the finished web page because the designer will usually specify a particular run time style sheet to be applied to the finished product.

If JavaScript API layer 705 is exposed to designers, it may be possible to provide designers with extensibility with regard to the interface when changing design time views. In an example, users can create their own commands and make the JavaScript API calls. A user may use this API to create another command, dialog box, floater panel, radio button, or the like to operate on the currently selected object on the page. For example, a user may create a specific toggle button on a toolbar to affect design time views of objects.

An advantage offered by one or more embodiments of the present invention is that the user does not have to change the code of various style sheets and then remember to change it back when he or she is done. It may also save a user from having to manually apply one or more design time style sheets specifically for the purpose of changing the design time view of a particular element. This may help to eliminate the need for a user to be especially knowledgeable about HTML or CSS, such as where in the code to go and which particular rule to edit or change in order to affect a particular feature of an object.

Although the examples above are in the context of design time, various embodiments of the invention may be adapted for use in other contexts, as well. For example, a web browser that allows viewers to switch from hidden view to full view of an object while viewing, rather than designing, web pages is possible. Further, various embodiments are not limited to two design time views per object. Some embodiments may allow a user to choose from three or more views and may even give the user a choice as the number of available views.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 8:
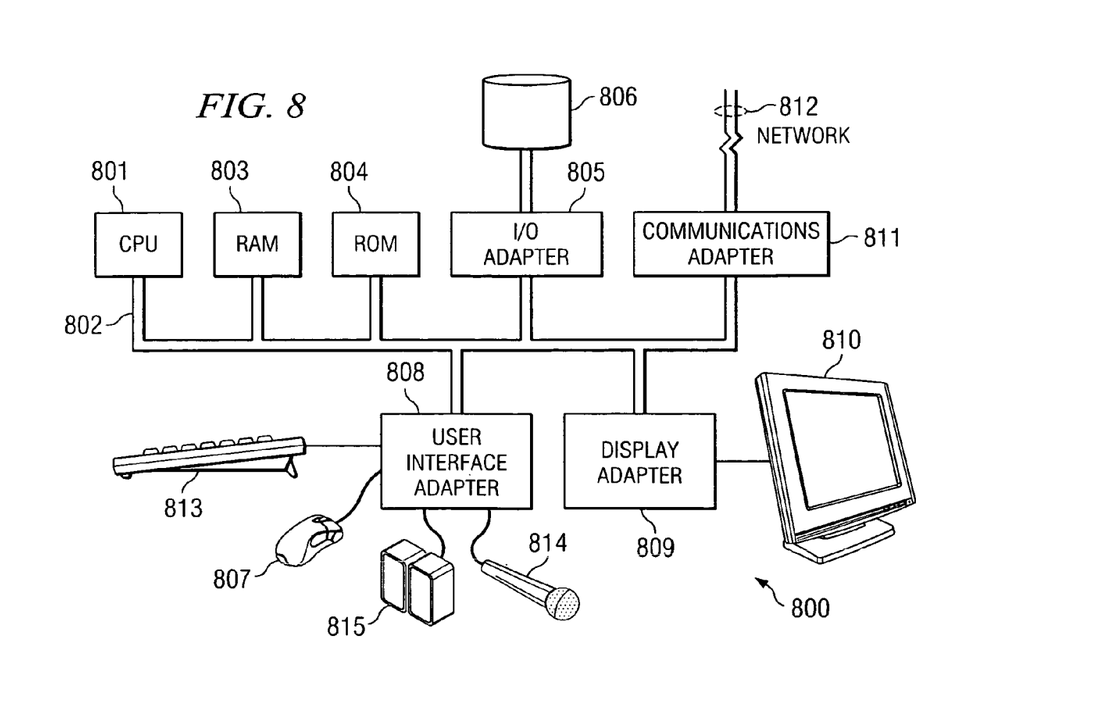
FIG. 8 illustrates an example computer system adapted according to embodiments of the present invention.

FIG. 8 illustrates example computer system 800 adapted according to embodiments of the present invention. That is, computer system 800 comprises an example system on which embodiments of the present invention may be implemented. Central processing unit (CPU) 801 is coupled to system bus 802. CPU 801 may be any general purpose CPU. However, the present invention is not restricted by the architecture of CPU 801 as long as CPU 801 supports the inventive operations as described herein. CPU 801 may execute the various logical instructions according to embodiments of the present invention. For example, CPU 801 may execute machine-level instructions according to the exemplary operational flows described above in conjunction with FIGS. 1 and 6.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as, for example, right-clicking on a menu to select a design view change.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for program 703 (FIG. 7). Communications adapter 811 is preferably adapted to couple computer system 800 to network 812 (e.g., the Internet). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display the user interface (illustrated in FIGS. 2-5) of embodiments of the present invention.

It shall be appreciated that the present invention is not limited to the architecture of system 800. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:
providing a user with an option in a web-page design application to toggle a current style of a selected element to change a design time view of said selected element, wherein said selected element is selected from one or more elements making up content of a web page under design;
changing the design time view of said selected element in response to the user exercising said option, wherein the design time view of said selected element changes to display content of said selected element that was hidden prior to the user exercising said option; and
restoring said current style to said selected element in response to the user exercising said option to toggle back to said current style.

2. The method of claim 1 wherein said changing said design time view of said element includes changing one or more styles in a currently-applied design time style sheet.

3. The method of claim 2 wherein said currently-applied design time style sheet is a Cascading Style Sheets (CSS)-type style sheet.

4. The method of claim 2 wherein said currently-applied design time style sheet is an internal representation in memory of portions of one or more user-specified design time style sheets.

5. The method of claim 1 wherein said element is selected from the group consisting of:
a text object;
an image object;
a link object; and
a sound object.

6. The method of claim 1 wherein said element is described as a CSS overflow object.

7. The method of claim 1 wherein said element is described as:
a "display:none" object; or
a "visibility:hidden" object.

8. The method of claim 1 wherein providing said user with an option to toggle a current style includes presenting a menu to said user in response to a right mouse click.

9. The method of claim 1 wherein providing said user with an option to toggle a current style includes accepting a double mouse click as a request to exercise said option.

10. The method of claim 1, wherein, in response to the user exercising said option, the design time view of said selected element changes to display all content of said selected element.

11. The method of claim 1, wherein, in response to the user exercising said option, the design time view of said selected element changes to allow editing of content that was hidden prior to the user exercising said option.

12. The method of claim 1, wherein, in response to the user exercising said option, the design time view of said selected element changes to obscure display of another of the one or more elements making up content of the web page under design.

13. A computer implemented method comprising:
receiving input from a user interacting with a user interface in a web page creation program, wherein said input specifies a design time view change for an object selected from a plurality of web page objects;
automatically editing a currently applied design time style sheet according to the design time view change;
rendering a changed design time view of the object according to the edited, currently applied design time style sheet, wherein the design time view of the object changes to display content of the object that was hidden.

14. The method of claim 13 wherein said input from said user specifies one of three alternate views.

15. The method of claim 13 wherein said interaction with said user interface includes said user selecting a design view change option provided on a menu on a graphical user interface.

16. The method of claim 13 further comprising refreshing the design time view of the object to display the object in an original or default view.

17. A computer program product having a computer readable medium having computer program logic recorded thereon, comprising:
   code for receiving input from a user specifying a design time view change for one object selected by said user from a plurality of objects making up a web page under design;
   code for automatically changing an internal design time style sheet according to said specified design time view change;
   code for rendering a design time view of said one object according to said changed internal design time style sheet, wherein the design time view of said one object changes to display content of said one object that was hidden;
   code for receiving additional input from the user specifying change to another design time view for said one object; and
   code for refreshing said design time view of said one object to display said one object in said another design time view.

18. The computer program product of claim 17 further comprising code for providing extensibility to said user to define an interface that receives said input from said user.

19. The computer program product of claim 17, further comprising code for providing a code view to said user.

20. The computer program product of claim 17 further comprising:
   code for applying one or more user-defined design time style sheets to said design time view; and
   code for using portions of said one or more user-defined design time style sheets to create said internal design time style sheet.

* * * * *

UNITED STATES PATENT AND TRADEMARK OFFICE
CERTIFICATE OF CORRECTION

PATENT NO. : 7,640,505 B1  Page 1 of 1
APPLICATION NO. : 11/112964
DATED : December 29, 2009
INVENTOR(S) : Randall Edmunds It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Ninth Day of November, 2010

David J. Kappos
*Director of the United States Patent and Trademark Office*